United States Patent
Murdock et al.

(10) Patent No.: US 6,473,709 B2
(45) Date of Patent: Oct. 29, 2002

(54) COMPUTER HAVING MULTIPLE ALARM FUNCTION COMMUNICATION PATHS

(75) Inventors: Doug Murdock, Toddville, IA (US); David Medin, Marion, IA (US); Chris Jensen, Iowa City, IA (US); Eric Busch, Cedar Rapids, IA (US); Alan Coats, Cedar Rapids, IA (US)

(73) Assignee: Crystal Group Inc., Hiawatha, IA (US)

( * ) Notice: Subject to any disclaimer, the term of this patent is extended or adjusted under 35 U.S.C. 154(b) by 0 days.

(21) Appl. No.: 09/909,444

(22) Filed: Jul. 19, 2001

(65) Prior Publication Data

US 2001/0041969 A1 Nov. 15, 2001

Related U.S. Application Data

(63) Continuation of application No. 09/188,620, filed on Nov. 9, 1998, now Pat. No. 6,304,831.

(51) Int. Cl.[7] .......................... G06F 13/00; G06F 15/00
(52) U.S. Cl. .......................... 702/132; 702/130; 710/4; 710/18
(58) Field of Search ............................... 702/127, 130, 702/132, 188; 710/101, 102, 119–120, 128–129, 15, 301, 4, 18; 714/25, 40

(56) References Cited

U.S. PATENT DOCUMENTS

| | | | |
|---|---|---|---|
| 4,918,690 A | 4/1990 | Markkula, Jr. et al. | |
| 4,941,143 A | 7/1990 | Twitty et al. | |
| 5,182,746 A | 1/1993 | Hurlbut et al. | |
| 5,297,143 A | 3/1994 | Fridrich et al. | |
| 5,325,491 A | 6/1994 | Fasig | |
| 5,426,739 A | 6/1995 | Lin et al. | |
| 5,596,726 A | * 1/1997 | Thielen | 710/4 |
| 5,630,048 A | * 5/1997 | La Joie et al. | 714/25 |
| 5,781,747 A | 7/1998 | Smith et al. | |
| 5,822,551 A | 10/1998 | Crane, Jr. et al. | |
| 5,835,700 A | * 11/1998 | Carbonneau et al. | 714/44 |
| 5,852,725 A | * 12/1998 | Yen | 710/301 |
| 5,966,510 A | * 10/1999 | Carbonneau et al. | 710/18 |
| 6,122,678 A | * 9/2000 | Eckel et al. | 710/15 |

* cited by examiner

*Primary Examiner*—Bryan Bui
(74) *Attorney, Agent, or Firm*—Simmons, Perrine, Albright & Ellwood, P.L.C

(57) ABSTRACT

A computer having a backplane and a motherboard disposed on the backplane along with expansion slots for receiving expansion cards. The backplane further having circuitry coupled thereto for performing an alarm function where the alarm circuitry is not coupled to a card occupying one of the expansion slots, instead the alarm circuitry is coupled to the backplane in a manner so that it is not directly under the supervision of the system processor on the motherboard. The alarm circuitry including processors which use the LON bus protocols for receiving and transmitting information relating to environmental conditions in the PC.

3 Claims, 4 Drawing Sheets

COMPUTER HAVING MULTIPLE ALARM FUNCTION COMMUNICATION PATHS

CROSS REFERENCE TO RELATED APPLICATION

This application is a continuation of application 09/188,620 filed on Nov. 9, 1998, now U.S. Pat. No. 6,304,831.

This application relates to copending application entitled, "Computer Having Backplane and Daughter Card for Alarm Functions" by David Medin, Robert D. Hinds, Alan Coats, and Scott Kayser filed on even date herewith and assigned to a common assignee, which application is incorporated herein by this reference.

BACKGROUND OF THE INVENTION

The present invention generally relates to personal computers (PCs) and even more particularly relates to a network of personal computers having alarm functions. The terms computer, personal computer, and PC as used herein shall be construed to include all types of computers, including mini computers, work stations, portable computers, and desktop computers; the term personal computer is merely exemplary of the various other types.

Many companies that have a complex network of connected PCs often find it critical to their daily operations to maintain full use of such PCs. It may be a serious problem to a company that uses networked PCs for a wide variety of functions if just one of these networked PCs fails. Consequently, various approaches have been used in the past to reduce the exposure to problems caused by failures of networked PCs. Alarm functions have been included in PCs to alert PC operators and service personnel of situations that might indicate a potential future failure. These situations can include things such as CPU and cabinet temperature, fan speeds, and voltage levels, etc.

Service personnel can remotely monitor and control various problems with PCs on the network. One of the methods of remotely monitoring has been to use the Simple Network Management Protocol (SNMP) communication on the PC's normal communication network. While this has several beneficial aspects, it has some drawbacks as well. First of all, the use of an SNMP approach on the PC's normal communication network requires that the system microprocessor be operational; i.e. If a general fault error or other serious error has occurred, then the monitoring function is often unable to be remotely usable.

Consequently, there exists a need for improved network PC monitoring capabilities.

SUMMARY OF THE INVENTION

It is an object of the present invention to provide a robust monitorable networked PC.

It is a feature of the present invention to include an "out-of-band" communication path for providing PC health information.

It is an advantage of the present invention to achieve a reliable and independent path of PC health information.

It is another object of the present invention to provide remote switching of the PC on/off switch.

It is another feature of the present invention to include an alarm function having an independent processor, not necessarily under the direct control of the system processor.

It is another advantage of the present invention to have an operable alarm/remote switching system under conditions when the PC system processor is either off or in need of resetting, etc.

The present invention is a method and apparatus for providing PC alarm functions to a remote location which is designed to satisfy the aforementioned needs, provide the previously stated objects, include the above-listed features, and achieve the already articulated advantages The invention is carried out in a "system processor-less" approach in the sense that the PC system microprocessor is not necessarily directly in control of the alarm function and its remote reporting ability.

Accordingly, the present invention is a PC alarm system having a microprocessor, independent of necessary direct control of the PC system microprocessor, and an independent LON bus communication path for communicating PC health information to another PC.

BRIEF DESCRIPTION OF THE DRAWINGS

The invention may be more fully understood by reading the following description of preferred embodiments of the invention, in conjunction with the appended drawings wherein.

DESCRIPTION OF THE PREFERRED EMBODIMENT

Figure 1:
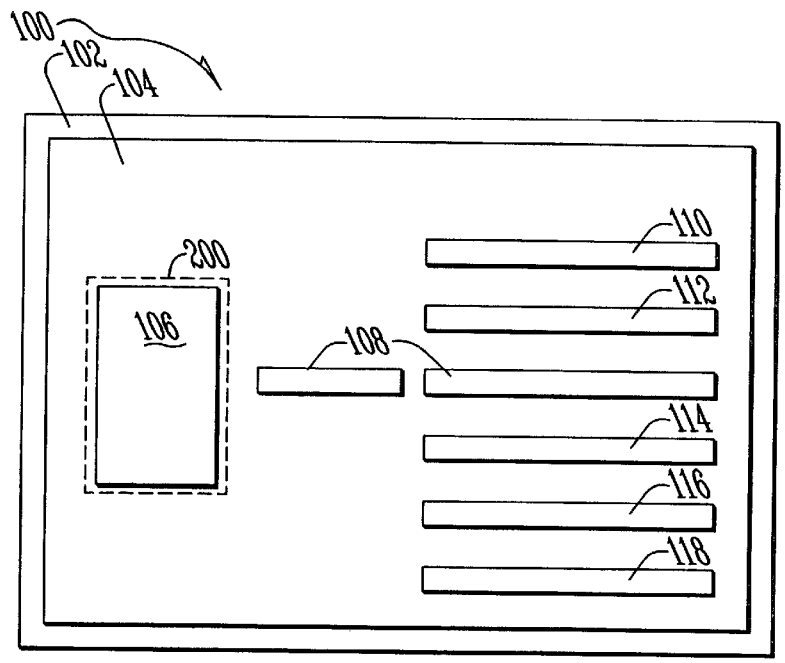
FIG. 1 is a simplified plan view of a PC of the present invention wherein the dashed lines represent a location for an alarm daughter card which is the subject of FIG. 2.
Figure 2:
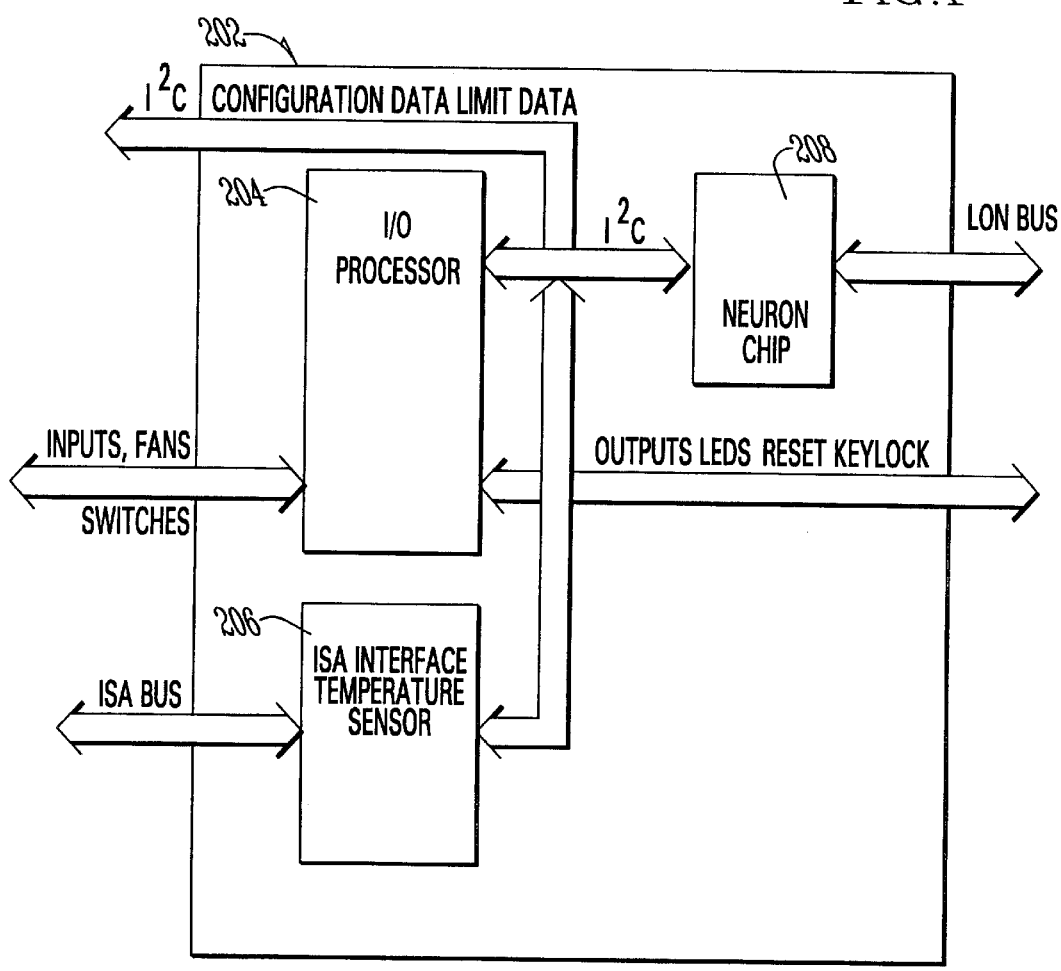
FIG. 2 is a functional block diagram of an alarm card of the present invention which includes LON bus functionality.

Now referring to the drawings, wherein like numerals refer to like matter throughout, and more particularly to FIG. 1, there is shown a plan view of a personal computer, generally designated 100, of the present invention, including an exterior case 102 and a backplane circuit board 104, which is disposed inside of case 102. Case 102 may be a rigid metal box having ventilation holes thereon or any other suitable case. Backplane 104 includes an area 106 thereon for receiving an alarm circuit card as shown in FIG. 2. Backplane 104 may be a printed circuit board or other substrate containing numerous interconnections, interfaces and other components needed to facilitate communication and cooperation among various portions of the computer 100. The alarm circuit card may be placed in area 106 in a coplanar manner with respect to backplane 104. However, other arrangements of connecting the alarm card with the backplane 104 are contemplated and may be desirable, depending on the precise requirements of any particular PC design. The backplane 104 is shown having several connection slots which may be for receiving a motherboard. The term "motherboard" is used herein to designate a circuit card which contains the system microprocessor for the PC 100. The system processor is the main processor in the PC 100 which may be a Pentium processor made by Intel Corporation or other suitable processors. The mother card (not shown) could be inserted into slot 108 and might then extend in a direction above and perpendicular to the backplane 104. Because of the coplanar nature of the arrangement of the alarm daughter card 200, a motherboard may extend beyond slot 108 and be disposed over and above the alarm daughter card 200. Backplane 104 contains numerous and various interconnections between the various components which may be mounted thereon, including interconnections commonly known as an expansion bus. Backplane 104 is shown having slots 110, 112, 114, 116 and 118, which may be connectors (i.e. i/o to the expansion bus) for receiving ISA or PCI expansion cards. ISA and PCI are well known industry standards for expansion buses, cards and connectors. Backplane 104 may have the expansion bus formed integrally thereon, with traces on the circuit board or wires, ribbons of wires coupled thereto, etc. or combinations of them.

Now referring to FIG. 2, there is shown an alarm card of the present invention, generally designated 200. The alarm card 200 generally provides the functionality needed to monitor and control the operation of the PC 100. For example, CPU temperature is commonly monitored to assure that it is not overheating to a point where a failure is more likely. The fan speeds are monitored as an indirect indication of future temperature and the ability of the PC to maintain temperature stability. Alarm card 200 can provide numerous other monitoring and control functions, including resetting the computer 100 if a fault has occurred. Numerous ISA and PCI expansion cards are commercially available for use in an ISA or PCI slot in a computer. These ISA or PCI alarm cards are illustrative of the many functions that may be performed by an alarm card. The precise details are dependent upon the designer's choices, but are well understood in the art of PC design. The alarm card 200 of the present invention provides many of the well known and often desired features of an alarm card. However, the alarm card 200 provides additional functionality, as well as including an independent "out of band" communication path for delivery of information relating to PC health, such as temperature, fan speed, etc. The term "out of band" is used to describe a communication path which is not under the direct control of the system processor and does not require maintaining communication over the normal PC network which may be an Ethernet connection, TCP/IP connection or any network connection used by computer for communication. The advantage of the "out of band" path is that it continues to operate even if the normal PC network connection scheme is not currently operating. "Out of band" communication may vary from a simple relay contact closure to a complex data pathway. In a preferred embodiment, the use of separate processors and dedicated connection for a "Local Operating Network" (LON) bus communication provides many benefits of the present invention. Also shown is alarm card substrate 202 and various processors and interface interconnections, including I/O processor 204 which may be a PIC16C65 processor manufactured by Microchip, or any processor which is capable of performing similar functions, including routing various inputs and outputs onto the alarm card 200. Also disposed on the substrate 202 is ISA interface and temperature sensor 206, which may be a LM78 chip manufactured by National Semiconductor or any similar chip or processor which is capable of performing similar functions, including the necessary interface with an ISA bus. ISA interface 206 may have a temperature sensor built integrally therein for providing much needed information relating to temperatures within the case 102.

Substrate 202 also is shown having a neuron processor 208, which is preferably manufactured by the Motorola Corporation and is commercially available and is well known in the art. Neuron chip 208 may be the master processor on the card 200 and could make all decisions relating to the alarm functions of the present invention. Neuron chip 208 may contain numerous interfaces and additional chips, such as a transceiver chip.

Figure 3:
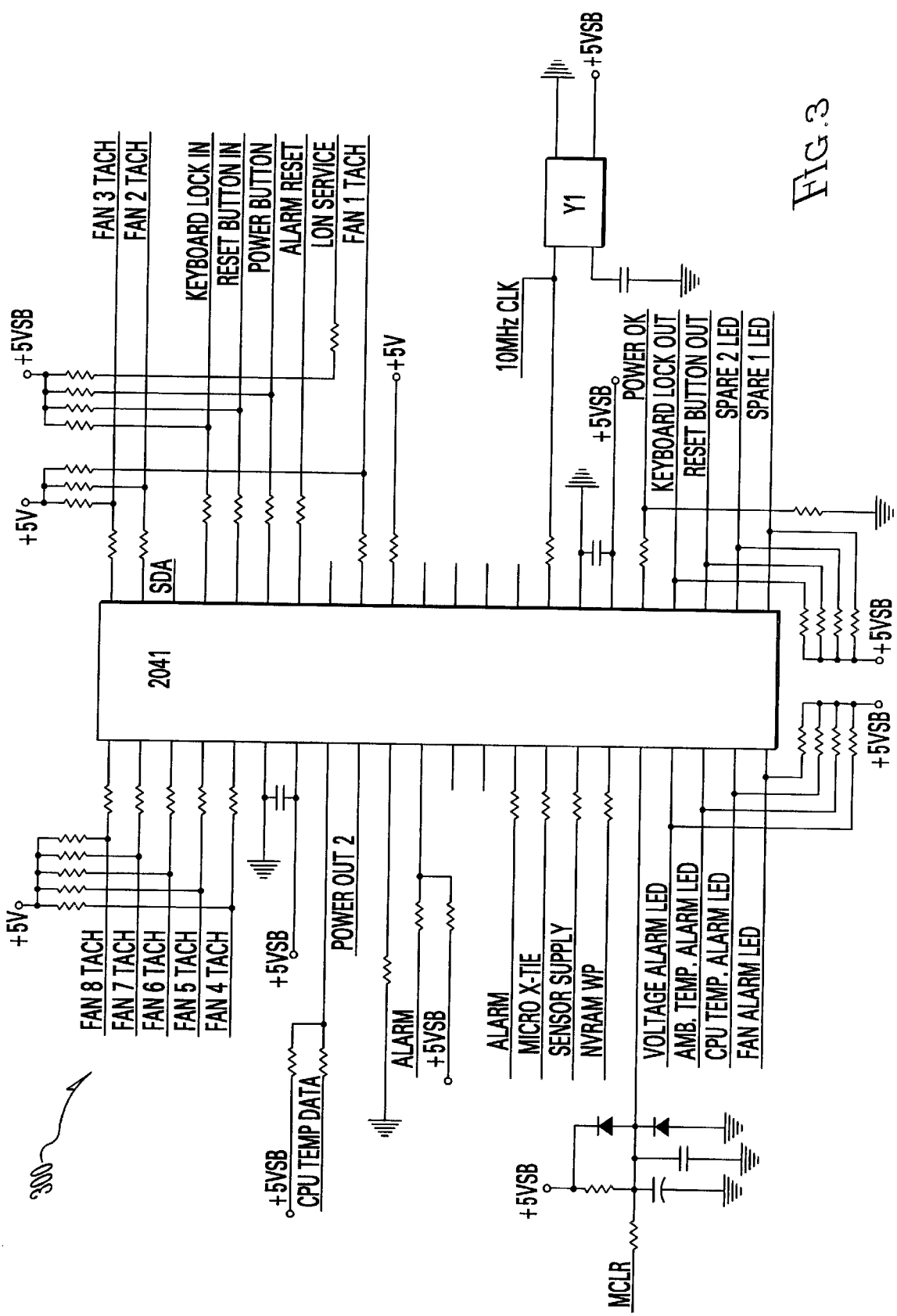
FIG. 3 is a schematic diagram of portions of the alarm card of FIG. 2.

Now referring to FIG. 3, there is shown a detailed schematic diagram, generally designated 300, of the present invention, which relates to I/O processor block 204 of FIG. 2 and its associated interface connections. An I/O processor 2041 is shown therein with numerous interconnections to various inputs and outputs to the alarm card 200. Chip 2041 may be a PIC16C65 chip manufactured by Microchip, but any processor may be substituted which is capable of performing similar functions. Processor 2041 may be a slave to the neuron block 208 of FIG. 2. Processor 2041 has numerous inputs and outputs including: inputs from fans, which may be three wire fans having a built-in tachometer (which are well known in the art), external temperature sensor, inputs from switches elsewhere on the computer 100, including a front panel, outputs to LED or other display devices, outputs to CPU card, and other assorted connections which will vary, depending upon choices made during the design of any particular PC type. These assorted connections would be familiar to those skilled in the art.

Figure 4:
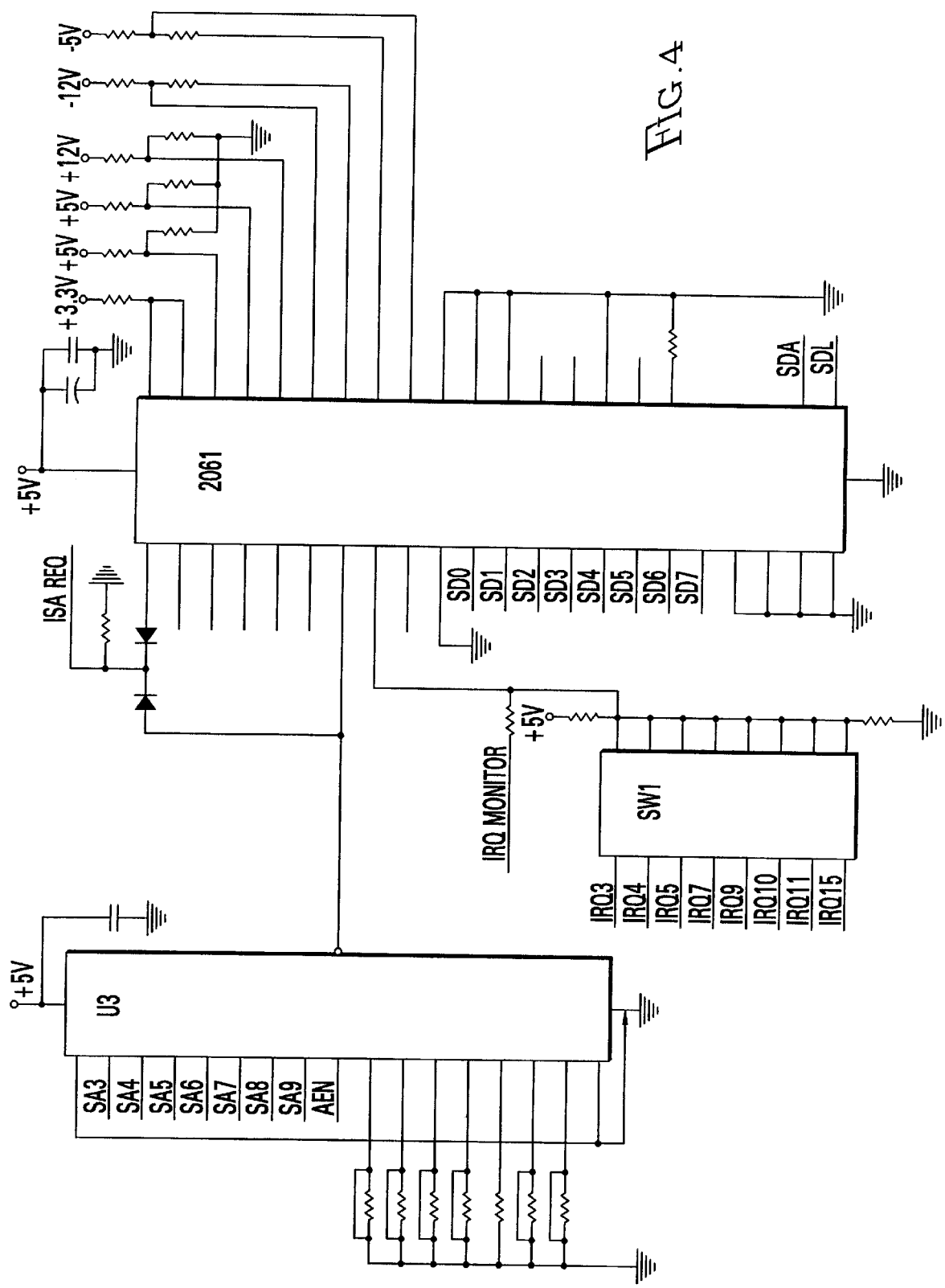
FIG. 4 is a detailed schematic diagram of portions of the alarm card of FIG. 2.

Now referring to FIG. 4, there is shown a detailed schematic diagram of the ISA interface block 206 of FIG. 2, which generally performs the function of interfacing information to be communicated over the ISA expansion bus. Interface block 206 includes an ISA interface chip 2061 which may have an ambient case temperature sensor built therein. Chip 2061 may be a LM78 model manufactured by National Semiconductor or any processor which is capable of performing similar functions. FIG. 4 shows numerous and various interconnections between blocks 206, blocks 204 and 208 of FIG. 2.

Figure 5:
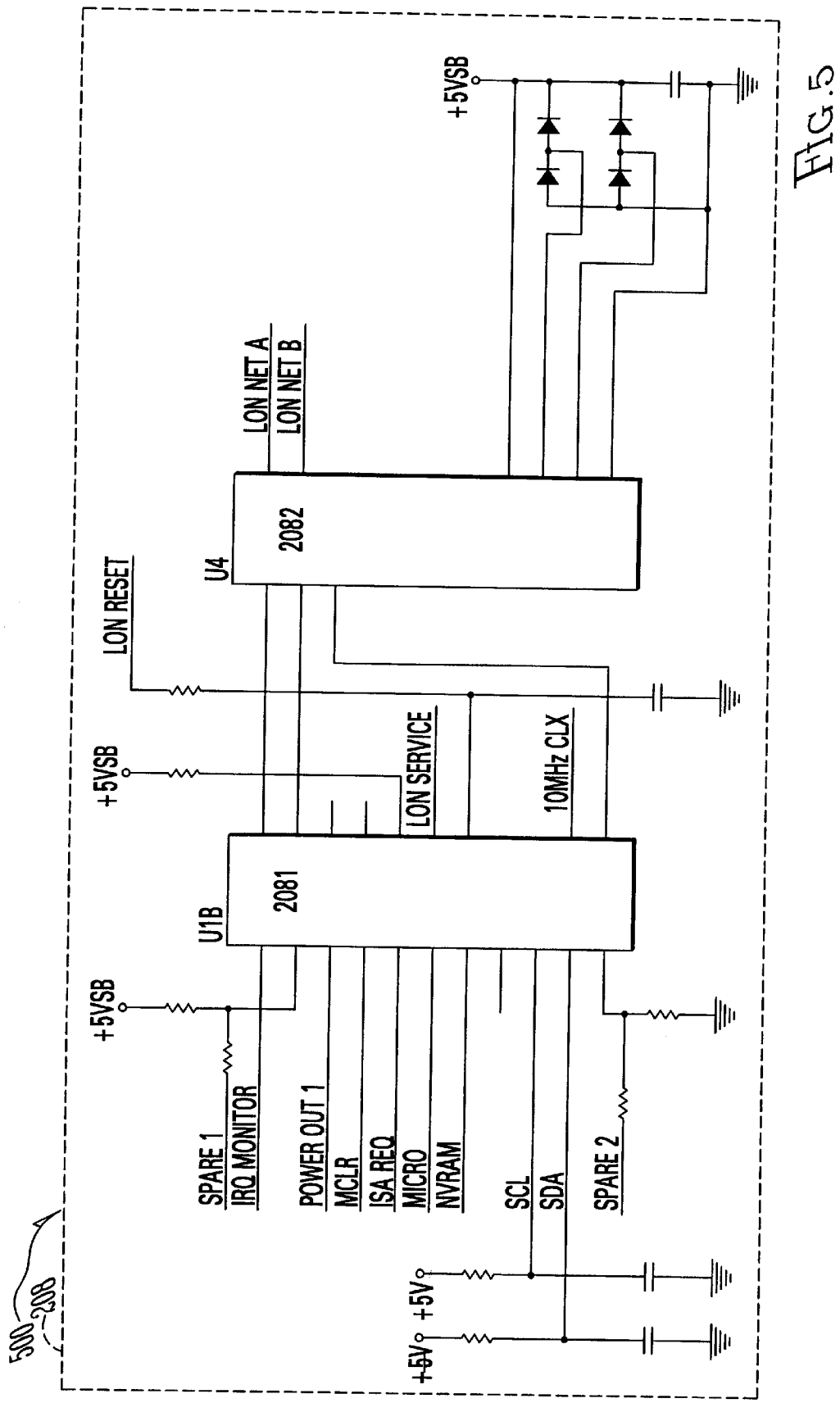
FIG. 5 is a detailed schematic diagram of portions of the alarm card of FIG. 2.

Now referring to FIG. 5, there is shown a detailed schematic diagram generally designated 500, of the present invention which relates to neuron processor block 208 of FIG. 2, which includes therein a neuron processor chip 2081 and a LON transceiver chip 2082. Neuron processor chip 2081 and LON transceiver processor 2082 are commercially available and are well known in the art. Chips 2081 typically have excess computing capacity for performing functions beyond communication over a LON bus. Numerous and various interconnections between block 208 and other portions of the card 200 are included in circuit 500. Neuron chip 2081 may be the master chip on the alarm card 200.

The description herein discusses in some detail the alarm card 200 as a card which is detachable from the backplane 104. It should be understood that the same or similar circuitry could be implemented directly on the backplane 104. The present invention is, therefore, not intended to be limited to a LON bus on a detachable alarm card.

In operation, the PC 100 of the present invention generally operates as follows: the PC is capable of typical operation as a PC, but has enhanced alarm monitoring and reporting features. The alarm card 200 receives information from various sources within the PC 100 relating to temperature, fan speed, etc. The current information may be compared with predetermined limits or ranges of expected values, (which may be stored on the backplane 104 in an EEPROM or any other suitable storage media) and an alarm may be activated depending on user preference. The alarm may be a local visual indication on the front panel or it may be remotely communicated over the PCs normal network connection and over a LON bus connection. This LON bus connection may be dedicated solely for communication of PC health alarm information and controls relating to turning the PC 100 and portions of it on or off. Because the LON bus has separate transmission lines, independent processor, etc., it is capable of remotely reporting information even if the PC 100 is otherwise inoperable or not capable of communicating over another network used for general network communication.

Throughout this disclosure, the terms "LON bus", "LON chip", "LON processor", "LON transceiver", etc. refer to buses, chips, processors, transceivers which generate, process or transmit or receive information in accordance with the LON Talk protocol. The term "LON Talk protocol" shall refer to any protocol which is designed for use with a polarity insensitive two wire medium having relatively high noise immunity where the protocol offers at least some of the following: end-to-end acknowledgment, sender and receiver authorization authentication, collision avoidance properties, collision detection and retransmission after collision.

It is thought that the method and apparatus of the present invention will be understood from the foregoing description, and it will be apparent that various changes may be made in the form, construction, steps and arrangements of the parts and steps thereof without departing from the spirit and scope of the invention or sacrificing all of their material advantages, the form herein described being merely preferred or exemplary embodiments thereof.

We claim:

1. A computer comprising:
   a protective case;
   a backplane disposed inside said protective case;
   a system microprocessor coupled to said backplane;
   a plurality of expansion slots, each coupled to the backplane and a first bus which is operated under the supervision of the system microprocessor, each of the expansion slots having a connector for receiving an expansion card;
   said backplane coupled to alarm circuitry for monitoring environmental conditions inside said case, said alarm circuitry including a bus transceiver processor for transmitting and receiving second bus signals over a second bus without direct supervision of the system microprocessor;
   said second bus including a two wire local operating network connection which is polarity insensitive; and
   wherein said second bus signals are organized in a predetermined fashion which include data structures for accomplishing end-to-end acknowledgment and data structure for detecting collisions of data packets transmitted over said second bus.

2. A computer comprising:
   a protective case;
   a backplane disposed inside said protective case;
   a system microprocessor coupled to said backplane;
   a plurality of expansion slots, each coupled to the backplane and a first bus which is operated under the supervision of the system microprocessor, each of the expansion slots having a connector for receiving an expansion card;
   said backplane coupled to alarm circuitry for monitoring environmental conditions inside said case, said alarm circuitry including a bus transceiver processor for transmitting and receiving second bus signals over a second bus without direct supervision of the system microprocessor;
   said second bus including a two wire local operating network connection which is polarity insensitive;
   wherein said system processor is disposed on a motherboard and thereby indirectly coupled to said backplane; and
   wherein said second bus signals are organized in a predetermined fashion which include data structures for accomplishing end-to-end acknowledgment and data structure for detecting collisions of data packets transmitted over said second bus.

3. A computer of claim 2 wherein said second bus signals include data structures therein for providing network management services for installation and configuration of nodes on said second bus and for downloading of software over said second bus for use in connection with said alarm circuitry.

* * * * *